US009838690B1

(12) United States Patent
Grange et al.

(10) Patent No.: US 9,838,690 B1
(45) Date of Patent: Dec. 5, 2017

(54) SELECTIVE PREDICTION SIGNAL FILTERING

(71) Applicant: GOOGLE INC., Mountain View, CA (US)

(72) Inventors: Adrian Grange, Mountain View, CA (US); James Bankoski, Mountain View, CA (US); Paul G. Wilkins, Cambridge (GB); Yaowu Xu, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/149,283

(22) Filed: May 9, 2016

Related U.S. Application Data

(63) Continuation of application No. 13/546,402, filed on Jul. 11, 2012, now Pat. No. 9,344,729.

(51) Int. Cl.
*H04N 19/117* (2014.01)
*H04N 19/103* (2014.01)
*H04N 19/80* (2014.01)

(52) U.S. Cl.
CPC ......... *H04N 19/117* (2014.11); *H04N 19/103* (2014.11); *H04N 19/80* (2014.11)

(58) Field of Classification Search
CPC ...... H04N 19/117; H04N 19/80; H04N 19/86; H04N 19/103
See application file for complete search history.

(56) References Cited

U.S. PATENT DOCUMENTS

| | | | | |
|---|---|---|---|---|
| 2007/0140338 A1* | 6/2007 | Bhaskaran | ........... | H04N 19/147 375/240.12 |
| 2007/0171988 A1* | 7/2007 | Panda | ................. | H04N 19/172 375/240.29 |
| 2007/0253483 A1* | 11/2007 | Lee | ...................... | H04N 19/176 375/240.12 |
| 2008/0253457 A1* | 10/2008 | Moore | .................. | H04N 19/52 375/240.16 |
| 2010/0027906 A1* | 2/2010 | Hara | ........................ | G06T 7/13 382/264 |
| 2010/0208944 A1* | 8/2010 | Fukunishi | ................ | G06T 5/50 382/107 |
| 2011/0116549 A1* | 5/2011 | Sun | ...................... | H04N 19/139 375/240.16 |

* cited by examiner

*Primary Examiner* — Thai Tran
*Assistant Examiner* — Christopher T Braniff
(74) *Attorney, Agent, or Firm* — Young Basile Hanlon & MacFarlane, P.C.

(57) ABSTRACT

Disclosed herein are methods and apparatuses for selective prediction signal filtering. One aspect of the disclosed implementations is a method for encoding a frame of a video stream including determining a first performance measurement for a first set of prediction samples identified for a group of pixels using a first prediction mode, generating a filtered set of prediction samples by applying a filter to a second set of prediction samples, wherein at least one of the filtered set of prediction samples or the second set of prediction samples are identified using a second prediction mode, determining a second performance measurement for the filtered set of prediction samples, generating, using a processor, a residual based on the filtered set of prediction samples and the group of pixels if the second performance measurement exceeds the first performance measurement, and encoding the frame using the residual.

20 Claims, 10 Drawing Sheets

SELECTIVE PREDICTION SIGNAL FILTERING

CROSS-REFERENCE TO RELATED APPLICATIONS

This application is a continuation of U.S. patent application Ser. No. 13/546,402, which was filed on Jul. 11, 2012.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

SUMMARY

Disclosed herein are implementations of systems, methods, and apparatuses for selective prediction signal filtering.

An aspect of the disclosed implementations is a method for encoding a video signal having a frame. The method includes determining a first performance measurement for a first set of prediction samples identified for a group of pixels of the frame using a first prediction mode, generating a filtered set of prediction samples for the group of pixels by applying a filter to a second set of prediction samples, wherein at least one of the filtered set of prediction samples or the second set of prediction samples are identified using a second prediction mode, determining a second performance measurement for the filtered set of prediction samples, generating, using a processor, a residual based on the filtered set of prediction samples and the group of pixels if the second performance measurement exceeds the first performance measurement, and encoding the frame using the residual.

An aspect of the disclosed implementations is an apparatus for encoding a video signal having a frame. The apparatus includes a memory and a processor configured to execute instructions stored in the at least one memory to: determine a first performance measurement for a first set of prediction samples identified for a group of pixels of the frame using a first prediction mode, generate a filtered set of prediction samples for the group of pixels by applying a filter to a second set of prediction samples, wherein at least one of the filtered set of prediction samples or the second set of prediction samples are identified using a second prediction mode, determine a second performance measurement for the filtered set of prediction samples, generate a residual based on the filtered set of prediction samples and the group of pixels if the second performance measurement exceeds the first performance measurement, and encode the frame using the residual.

An aspect of the disclosed implementations is a method for decoding an encoded video signal. The method includes decoding a prediction mode, a filter indicator, and a residual associated with a group of pixels of a frame of the encoded video signal, identifying a set of prediction samples for decoding the group of pixels based on the prediction mode, applying a filter to the identified set of prediction samples based on the filter indicator to generate a filtered set of prediction samples, and generating a reconstructed group of pixels using the filtered set of prediction samples and the residual.

These and other implementations will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1A:
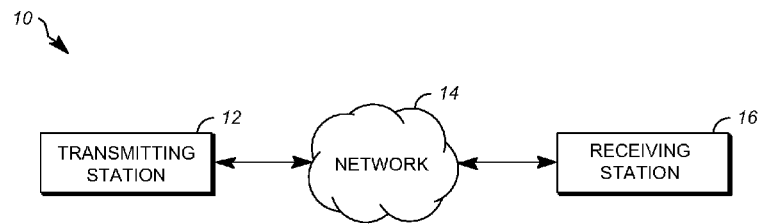
FIG. 1A is a schematic of a video encoding and decoding system.

To permit transmission of digital video streams while limiting bandwidth consumption, video encoding and decoding implementations can incorporate various compression schemes. These compression schemes generally break the image up into blocks and use one or more techniques to limit the amount of information included in a resulting compressed video bitstream for transmission. The bitstream, once received, is then decoded to re-create the blocks and the source images from the limited information. Digital video can be encoded into video bitstreams using formats such as VPx, H.264, MPEG, MJPEG, and/or others.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. Inter prediction can include using a previously encoded block from a previously encoded frame (reference frame). Intra prediction can include using a previously encoded block from the current frame. Using the previously encoded block can include using less than all of the pixels of the previously encoded block to generate a prediction block. Intra prediction can be used for encoding, for example, a frame of video or individual images.

The type of prediction utilized for a block or frame can be identified by a prediction mode which can be encoded into the compressed video bitstream to enable decoding. For example, intra prediction can include predicting values for a current block based on values of spatially proximate previously encoded blocks in the current frame which can be identified using one or more intra prediction modes, such as horizontal prediction (H_PRED), vertical prediction (V_PRED), DC prediction (DC_PRED), or TrueMotion prediction (TM_PRED). For example, inter prediction can include predicting values of a current block based on values of a reference block from a previously decoded frame or a reference frame that can be identified by a motion vector using one or more inter prediction modes, such as the use of neighboring motion vectors (MV_NEAR or MV_NEAREST), differentially encoded motion vectors (NEWMV), sub-block motion vectors (SPLITMV), and reference frame identifier (e.g., last frame, golden frame, alternate reference frame).

Many prediction techniques use block based prediction and quantized block transforms. The use of block based prediction and quantized block transforms can give rise to picture quality degradation, visual artifacts and discontinuities along block boundaries during encoding. These degradations, artifacts, and discontinuities can be visually disturbing and can reduce the quality of the decoded video and the effectiveness of the reference frame used as a predictor for subsequent frames. These degradations, artifacts, and discontinuities can be reduced by the application of selective prediction signal filtering, performance measurement for loop filtering, or both.

Selective prediction signal filtering can include generating a performance measurement for an encoding of a group of pixels using various prediction mode and filter combinations. The group of pixels can be, for example, a segment, macroblock, subblock, block, or individual pixel of a frame. Performance measurements can include, for example, a rate distortion measurement, sum of squared differences measurement, or any available error metric, rate metric, or combination thereof. Performance measurements can be made for a prediction mode with filtering and without filtering. In an implementation, a prediction mode can be defined to include filtering or not include filtering. Filtering can include applying a Finite Impulse Response (FIR) filter in the horizontal and vertical directions to pixels in the group of pixels. In an implementation, filtering can include the use of other filters or filters applied in other directions. In an implementation, some pixels of the group of pixels may not be filtered based on pixel values to be used for filtering and threshold values defined for use with the filter being used. Performance measurements can be made for a single filter per prediction mode or multiple potential filters (e.g., filter type and/or filter strength) per prediction mode.

A prediction mode and filter can be selected for encoding the group of pixels based on the performance measurement, by, for example, selecting a prediction mode and filter having a smallest rate distortion (selecting a filter can include not applying a filter). The selected prediction mode and filter can be used to identify prediction samples used to generate a residual of the group of pixels for encoding. The encoding can include data indicative of the selected prediction mode and filter. A decoder can decode the encoding by, for example, identifying prediction samples for decoding using the selected prediction mode and by using the selected filter (or absence thereof).

Performance measurement for loop filtering can include generating performance measurements for a reconstruction of a group of pixels using various filter type and strength combinations. For example, available filter type and strengths can be applied to the group of pixels and a rate distortion measurement can be generated for each application. The resulting rate distortion measurements can be compared, and a filter type and strength having a lowest rate distortion measurement can be selected. The selected filter type and strength can be used to filter pixels in the reconstruction of the group of pixels. The selected filter type and strength can be included in the encoding of the group of pixels so that a decoder, when decoding the encoding, can apply the selected filter type and strength to the reconstruction of the group of pixels generated by the decoder.

FIG. 1A is a schematic of a video encoding and decoding system 10. An exemplary transmitting station 12 can be, for example, a computer having an internal configuration of hardware such as that described in FIG. 1B. However, other suitable implementations of the transmitting station 12 are possible. For example, the processing of the transmitting station 12 can be distributed among multiple devices.

A network 14 connects the transmitting station 12 and a receiving station 16. Specifically, a video stream can be encoded in the transmitting station 12 and the encoded video stream can be decoded in the receiving station 16. The network 14 can, for example, be the Internet. The network 14 can also be a local area network (LAN), wide area network (WAN), virtual private network (VPN), or any other means of transferring the video stream from the transmitting station 12.

Figure 1B:
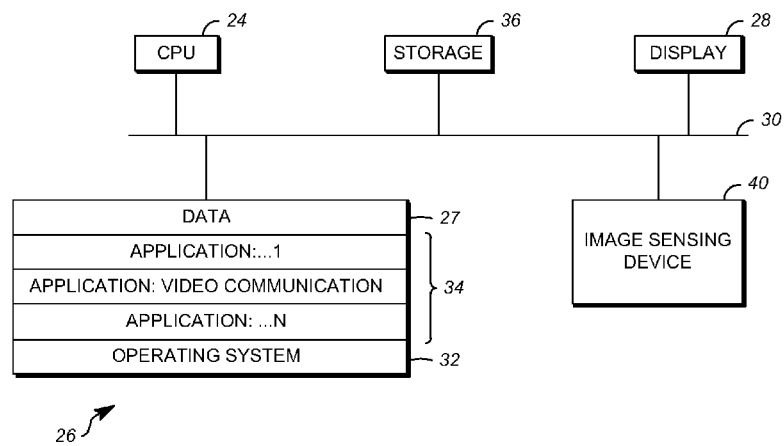
FIG. 1B is a block diagram of an example internal configuration of the transmitting station and the receiving station of FIG. 1A.

The receiving station 16, in one example, can be a computer having an internal configuration of hardware such as that described in FIG. 1B. Other suitable implementations of the receiving station 16 are possible. For example, the processing of the receiving station 16 can be distributed among multiple devices.

Other implementations of the encoder and decoder system 10 are possible. In an implementation, additional components can be added to the encoder and decoder system 10. For example, a second receiving station can be added. In an implementation, components can be removed from the encoder and decoder system 10. For example, the receiving station 16 and/or network 14 can be omitted, and the techniques and processes described herein (or a subset thereof) can be implemented using station 12.

FIG. 1B is a block diagram of an example internal configuration of transmitting station 12 and receiving station 16 of FIG. 1A. Each of stations 12, 16 can be in the form of a computing system including multiple computing devices, or in the form of a single computing device, for example, a mobile phone, a tablet computer, a laptop computer, a notebook computer, a desktop computer, and the like.

The CPU 24 in stations 12, 16 can be a conventional central processing unit. Alternatively, the CPU 24 can be any other type of device, or multiple devices, capable of manipulating or processing information now-existing or hereafter developed. Although the disclosed embodiments can be practiced with a single processor as shown, e.g. CPU 24, advantages in speed and efficiency can be achieved using more than one processor.

The memory 26 in stations 12, 16 can be a random access memory device (RAM). Any other suitable type of storage device can be used as the memory 26. The memory 26 can include code and data 27 that is accessed by the CPU 24 using a bus 30. The memory 26 can further include an operating system 32 and application programs 34, the application programs 34 including programs that permit the CPU 24 to perform the methods described here. For example, the application programs 34 can include applications 1 through N which further include a video communication application that can perform the methods described here. Stations 12, 16 can also include a secondary storage 36, which can, for example, be a memory card used with a mobile computing device. Because video communication can contain a significant amount of information, they can be stored in whole or in part in the secondary storage 36 and loaded into the memory 26 as needed for processing.

Stations 12, 16 can also include one or more output devices, such as display 28, which can be a touch sensitive display that combines a display with a touch sensitive element that is operable to sense touch inputs. The display 28 can be coupled to the CPU 24 via the bus 30. Other output devices that permit a user to program or otherwise use stations 12, 16 can be provided in addition to or as an alternative to the display 28. When the output device is or includes a display, the display can be implemented in various ways, including by a liquid crystal display (LCD) or a cathode-ray tube (CRT) or light emitting diode (LED) display, such as an OLED display.

Stations 12, 16 can also include or be in communication with an image-sensing device 38, for example a camera, or any other image-sensing device 38 now existing or hereafter developed. The image-sensing device 38 can be configured to receive images, for example, of the face of a device user while the device user is operating one of stations 12, 16.

Although FIG. 1B depicts the CPU 24 and the memory 26 of stations 12,16 as being integrated into a single unit, other configurations can be utilized. The operations of the CPU 24 can be distributed across multiple machines (each machine having one or more of processors) which can be coupled directly or across a local area or other network. The memory 26 can be distributed across multiple machines such as network-based memory or memory in multiple machines performing the operations of stations 12, 16. Although depicted here as a single bus, the bus 30 of stations 12, 16 can be composed of multiple buses. Further, the secondary storage 36 can be directly coupled to the other components of stations 12, 16 or can be accessed via a network and can comprise a single integrated unit such as a memory card or multiple units such as multiple memory cards. Stations 12, 16 can thus be implemented in a wide variety of configurations.

Figure 2:
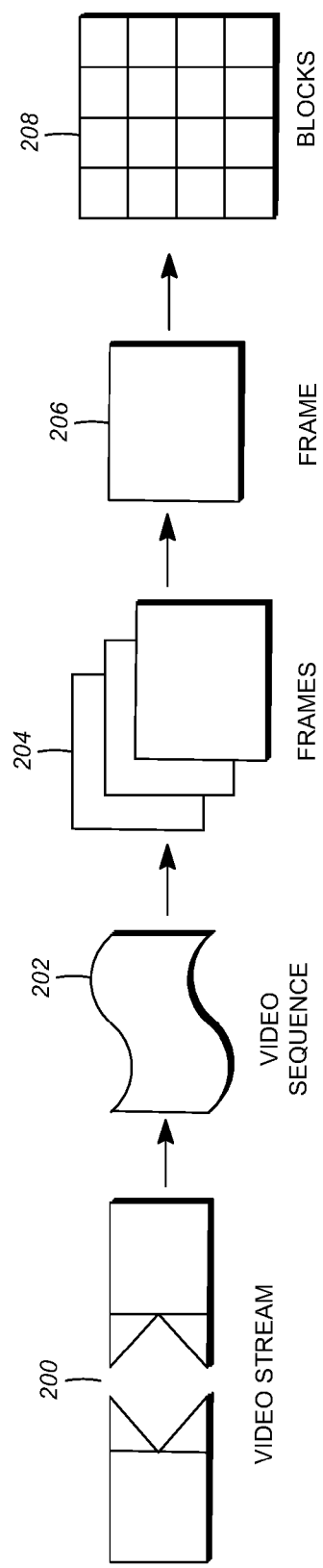
FIG. 2 is a diagram of a typical video stream to be encoded and/or decoded.

FIG. 2 is a diagram of a typical video stream 200 to be encoded and/or decoded. Video coding formats, such as VPx or H.264, provide a defined hierarchy of layers for a video stream. The video stream 200 includes a video sequence 202. At the next level, the video sequence 202 includes a number of adjacent frames 204. While three frames are depicted in adjacent frames 204, the video sequence 202 can include any number of adjacent frames. The adjacent frames 204 can then be further subdivided into a single frame 206. At the next level, the single frame 206 can be divided into a series of blocks 208, which can contain data corresponding to, for example, a 16×16 pixel group of displayed pixels in the frame 206. Each block can contain luminance and chrominance data for the corresponding pixels. The blocks 208 can also be of any other suitable size such as 16×8 pixel groups or 8×16 pixel groups. The terms block and macroblock can be used interchangeably herein.

Figure 3:
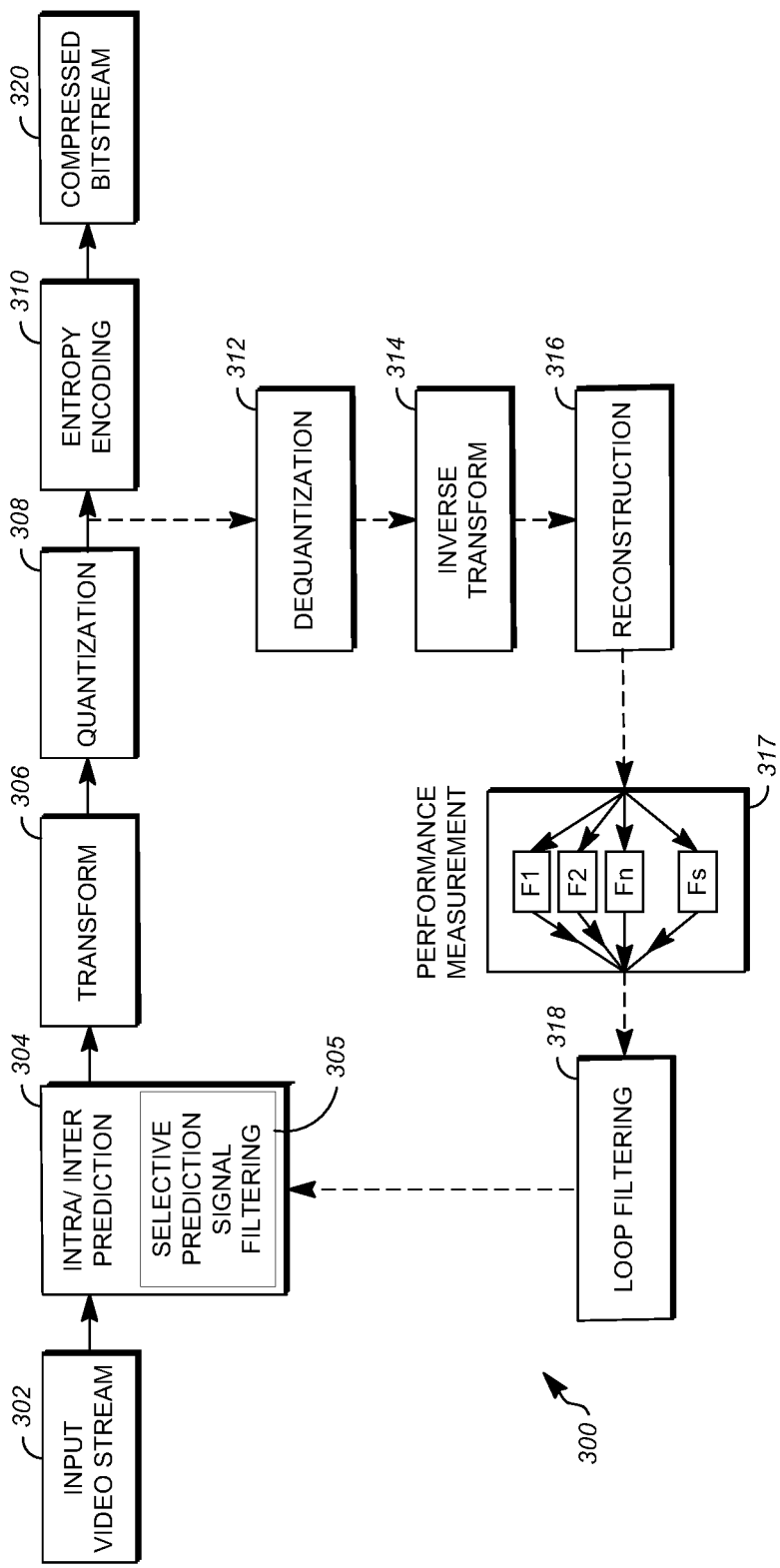
FIG. 3 is a block diagram of an encoding technique in accordance with an implementation of this disclosure.

FIG. 3 is a block diagram of an encoder 300 in accordance with an implementation of this disclosure. Encoder 300 can be implemented, for example, in transmitting station 12 by providing a computer software program stored in memory 26 or storage 36. The computer software program can include machine instructions that, when executed by CPU 24, cause transmitting station 12 to encode video data in the manner described in FIG. 3. Encoder 300 can also be implemented as hardware (e.g., an ASIC or FPGA) included in a computing device.

Encoder 300 encodes an input video stream 302 (e.g., video stream 200). Encoder 300 has the following stages to perform the various functions in a forward path (shown by the solid connection lines) to produce an encoded or a compressed bitstream 320: an intra/inter prediction stage 304, a transform stage 306, a quantization stage 308, and an entropy encoding stage 310. Encoder 300 also includes a reconstruction path (shown by the dotted connection lines) to reconstruct a frame for encoding of further blocks. Encoder 300 can include the following stages to perform the various functions in the reconstruction path: a dequantization stage 312, an inverse transform stage 314, a reconstruction stage 316, and a loop filtering stage 318. Other variations of encoder 300 can be used to encode the input video stream 302.

When the input video stream 302 is presented for encoding, a frame (e.g., frame 208) within the input video stream 302 can be processed full-frame, by units of macroblocks, or by any other segment of pixels in the frame. At the intra/inter prediction stage 304, blocks can be encoded using intra-frame prediction (within a single frame) or inter-frame prediction (from frame to frame). In either case, a prediction block can be formed. In the case of intra-prediction, a prediction block can be formed from prediction samples in the current frame that have been previously encoded and reconstructed. In the case of inter-prediction, a prediction block can be formed from prediction samples in one or more previously constructed reference frames.

Intra/inter prediction stage 304 can include a selective prediction signal filtering stage 305. For example, in an implementation, a prediction block can be formed from prediction samples that are filtered using a filter. Exemplary implementations of prediction signal filtering that can be incorporated into stage 305, such as technique 800, are described later with respect to FIG. 8.

Next, still referring to FIG. 3, the prediction block can be subtracted from the current block at the intra/inter prediction stage 304 to produce a residual block (residual). The transform stage 306 transforms the residual into transform coefficients in, for example, the frequency domain. Examples of block-based transforms include the Karhunen-Loéve Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

The quantization stage 308 converts the transform coefficients into discrete quantum values, which are referred to as quantized transform coefficients or quantization levels. The quantized transform coefficients are then entropy encoded by the entropy encoding stage 310. Entropy encoding can include the use of various techniques, such as formatting compressed bitstream 320 using run-length encoding (RLE) and zero-run coding. The entropy-encoded coefficients, together with the information used to decode the block, such as the type of prediction used, motion vectors, and quantizer value, are then output to the compressed bitstream 320.

The reconstruction path in FIG. 3 (shown by the dotted connection lines) can be used to ensure that both the encoder 300 and decoder 400 (described below) use the same reference frames to decode the compressed bitstream 320. The reconstruction path performs functions that are similar to functions that take place during the decoding process that are discussed in more detail below, including dequantizing the quantized transform coefficients at the dequantization stage 312 and inverse transforming the dequantized transform coefficients at the inverse transform stage 314 to produce a derivative residual block (derivative residual). At the reconstruction stage 316, the prediction block that was predicted at the intra/inter prediction stage 304 can be added to the derivative residual to create a reconstructed block. The loop filtering stage 318 can be applied to the reconstructed block to reduce distortion such as blocking artifacts.

An implementation of encoder 300 can include a group of filters, F1-Fn. In an implementation, compression can be optimized by filtering a set of pixels, such as a block of pixels 208, in a given frame 206 in the reconstruction path with filters F1-Fn or filters F1-Fn and default filter Fs which may be a sharpening filter or other suitable default filter. In an implementation, the group of filters can be utilized in intra/inter prediction stage 304 using selective prediction signal filtering stage 305. In various implementations, filtering can be used in the reconstruction loop, intra/inter prediction stage 304, or both. In an implementation, selective prediction signal filtering stage 305 can be included in intra/inter prediction stage 304 and application of the group of filters can be omitted from the reconstruction path (e.g., performance measurement stage 317 and/or loop filtering stage 318 can be omitted from encoder 300) so that the unfiltered data can be retained as an alternative predictor for current or future blocks.

Compressed bitstream 320 may include frames 204 that contain residual blocks. Because prediction blocks are subtracted from current blocks at intra/inter prediction stage 204 to form residual blocks, residual blocks can improve compression by reducing the number of bits used to represent frames in compressed bitstream 320. One way to reduce an amount of bits needed to represent the residual blocks is to improve the accuracy of prediction at the intra/inter prediction stage 304.

For example, in an implementation, the accuracy of prediction at stage 304 can be improved by a performance measurement stage 317 that can select between multiple filter settings for a given set of pixels at loop filter 318 depending on the characteristics of the set of pixels. In addition to improving accuracy, selecting between multiple filter settings can also improve compression. For example, performance measurement stage 317 can compare a performance measurement of a given macroblock after provisional application of a filter with a performance measurement of that same macroblock prior to any filtration. The performance measurement may indicate quality, error, compression characteristics or a metric that takes into account quality, error and compression characteristics. Based on the results of such a comparison, encoder 300 may select zero, one or multiple filters from the group of filters F1-Fn to be used for loop filtering at stage 318. Encoder 300 can select only the filters from F1-Fn that result in an improved performance measurement that exceeds the initial performance measurement for a particular block.

An improved performance measurement exceeds an initial performance measurement if its value is closer to a desired result. A desired result is typically a result in which a video signal is transmitted with higher quality or lower bandwidth or with greater reliability. Depending on the performance measurement, a measurement that exceeds another measurement could be numerically higher or lower than the other measurement. A performance measurement can be any metric used to indicate characteristics for a set of pixels. Rate distortion for example, is a metric that is a function of both error rate and coding efficiency. Customizing filtration on a macroblock by macroblock basis based on a performance measurement can result in a more robust and accurate prediction at intra/inter prediction stage 304. These and other implementations are described herein with respect to FIGS. 5-8.

Other variations of encoder 300 can be used to encode the compressed bitstream 320. For example, a non-transform based encoder can quantize the residual signal directly without the transform stage 306. Various forms of error testing, error correction and filtering can be implemented in the reconstruction loop. In an implementation, performance measurement stage 317 can be omitted and/or can be incorporated into loop filtering stage 318. In an implementation, an encoder can have the quantization stage 308 and the dequantization stage 312 combined into a single stage.

The encoding process shown in FIG. 3 can include two iterations or "passes" of processing the video data. The first pass can be carried out by encoder 300 using an encoding process that is less computationally intensive which gathers and stores information about input video stream 302 for use in the second pass. In the second pass, encoder 300 can use this information to optimize final encoding of compressed bitstream 320. For example, encoder 300 may use this information to select parameters for encoding, locating key-frames, selecting coding modes used to encode macroblocks such as blocks 208 and allocating the number of bits to each frame. The output of the second pass can be final compressed bitstream 320.

Figure 4:
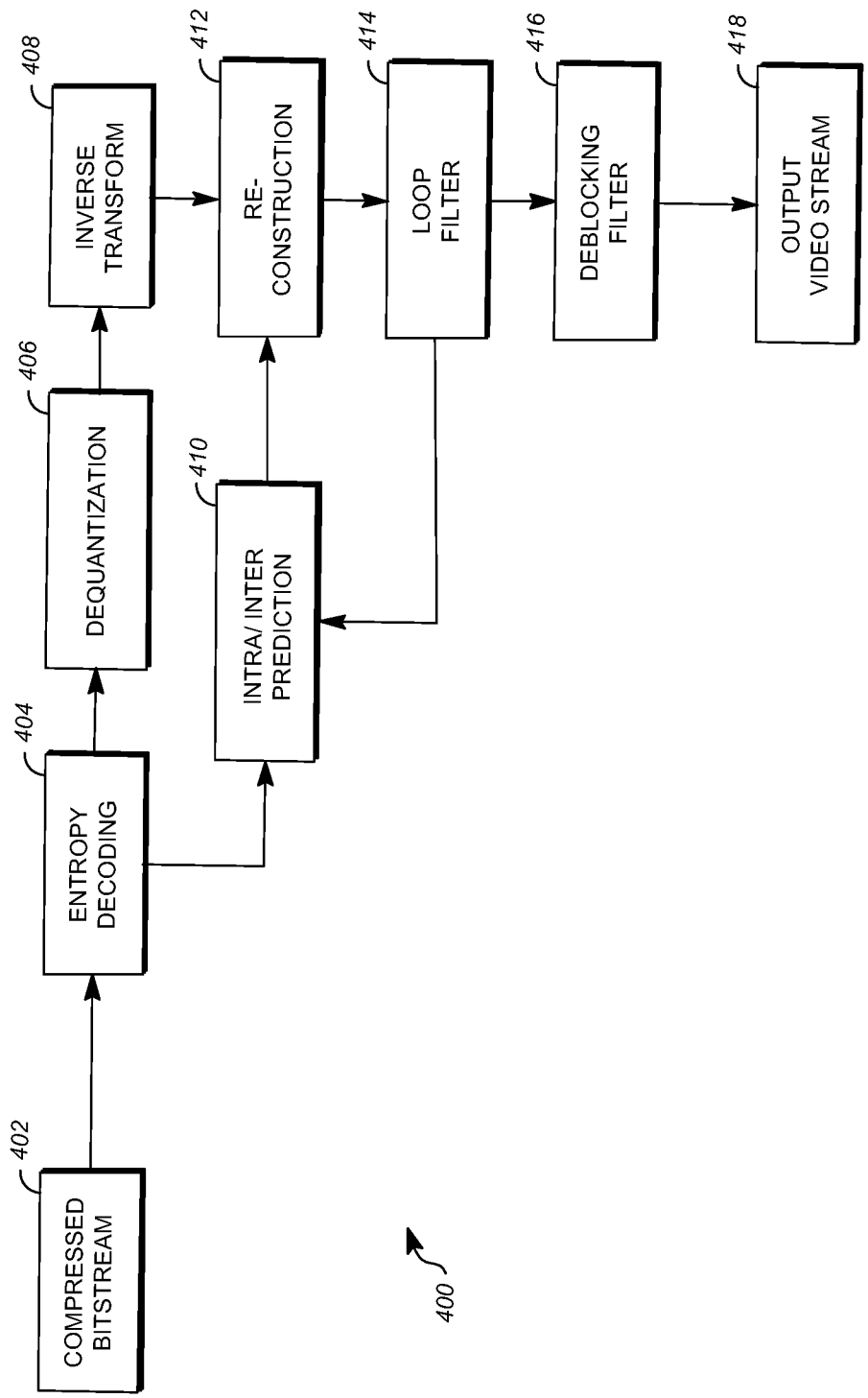
FIG. 4 is a block diagram of a decoding technique in accordance with an implementation of this disclosure.

FIG. 4 is a block diagram of a decoder 400 in accordance with an implementation of this disclosure. Decoder 400 can be implemented, for example, in receiving station 16 by providing a computer software program stored in memory 26 or storage 36. The computer software program can include machine instructions that, when executed by CPU 24, cause receiving station 16 to decode video data in the manner described in FIG. 4. Decoder 400 can also be implemented as hardware (e.g., an ASIC or FPGA) included in a computing device.

Decoder 400, similar to the reconstruction path of encoder 300 discussed above, includes in one example the following stages to perform various functions to produce an output video stream 418 from a compressed bitstream 402 (e.g., compressed bitstream 320): an entropy decoding stage 404, a dequantization stage 406, an inverse transform stage 408, an intra/inter prediction stage 410, a reconstruction stage 412, a loop filtering stage 414 and a deblocking filtering stage 416. Other variations of decoder 400 can be used to decode the compressed bitstream 402.

When the compressed bitstream 402 is presented for decoding, the data elements within the compressed bitstream 402 can be decoded by the entropy decoding stage 404 (using, for example, Context Adaptive Binary Arithmetic Decoding) to produce a set of quantized transform coefficients. The dequantization stage 406 dequantizes the quantized transform coefficients, and the inverse transform stage 408 inverse transforms the dequantized transform coefficients to produce a derivative residual. Using header information decoded from the compressed bitstream 402, decoder 400 can use the intra/inter prediction stage 410 to create a prediction block. At the reconstruction stage 412, the prediction block can be added to the derivative residual to create a reconstructed block. The loop filtering stage 414 can be applied to the reconstructed block to reduce blocking artifacts. The deblocking filtering stage 416 can be applied to the reconstructed block to reduce blocking distortion, and the result is output as the output video stream 418.

Other variations of decoder 400 can be used to decode the compressed bitstream 402. For example, decoder 400 can produce the output video stream 418 without the deblocking filtering stage 416. Furthermore, for a decoder 400 that decodes a bitstream sent from encoder 300 as shown in FIG. 3, the decoder 400 can include thresholding, error testing and selectable loop filtering in the feedback loop to intra/inter prediction stage 410 to create the same reconstructed macroblock that was created at encoder 300. Decoder 400 can also include filtering in inter/intra prediction stage 410.

Figure 5:
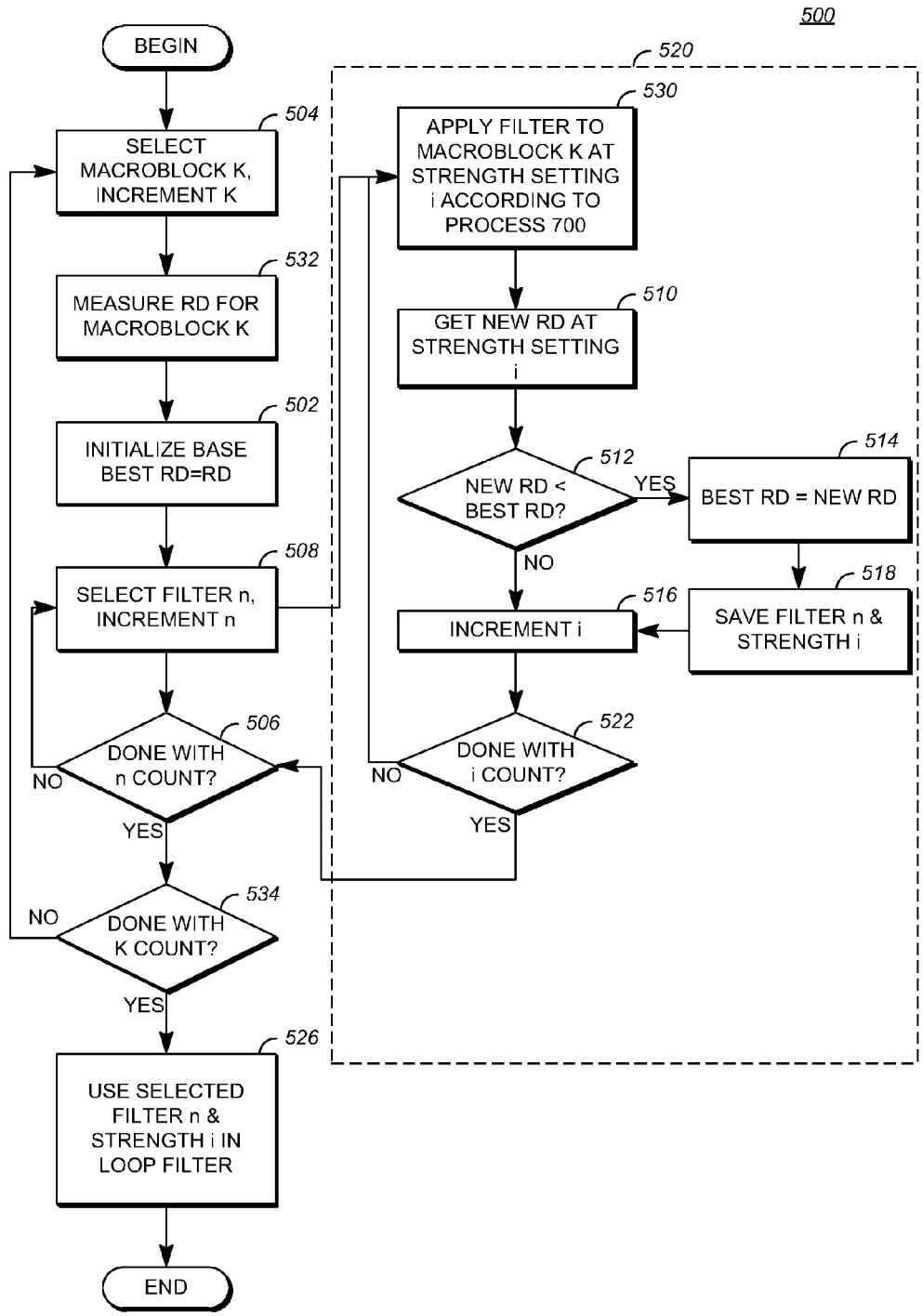
FIG. 5 is a flow chart of a technique for performance measurement in accordance with an implementation of this disclosure.

In an implementation, selecting a subset of pixels, taking a performance measurement of that subset and selecting filters for loop filtration can occur according to the flowchart of a technique 500 for performance measurement shown in FIG. 5. Technique 500 can be carried out, for example, by CPU 24 executing instructions stored in memory 26 of transmitting station 12 or receiving station 16. Technique 500 or aspects thereof can be incorporated, for example, into performance measurement stage 317 or intra/inter prediction stage 304 of encoder 300.

At step 504, a set of pixels are selected. The set of selected pixels and can be an entire frame of pixels, a macroblock of pixels, or any other segment or number of pixels derived from a reconstructed frame assembled at reconstruction stage 412. One example of an image segment or set of pixels is a macroblock of pixels 600 depicted in FIG. 6. At step 532, the reconstructed image segment or set of pixels is measured for an initial performance measurement. The initial performance measurement measures some indicator of quality or error such as differences between an original set of pixels as constituted prior to encoding 300 and the reconstructed version of the original set of pixels at reconstruction stage 316. During encoding, transform stage 306 and quantization stage 308 can create errors between a frame in input video stream 302 and the reconstructed version of that same frame at reconstruction stage 316. An initial performance measurement may measure these errors or other errors related to a reconstructed frame. The performance measurement itself can be a sum of squares error, a mean squared error, or various other suitable measurements of error. The initial performance measurement can also be a calculation such as rate distortion, which takes into account an error measurement as well as coding efficiency.

Once an initial performance measurement has been determined for a particular set of pixels at step 532, the performance measurement for that set of pixels is stored. For example at step 502, a variable, here called base best rd, is initialized to the initial performance measurement for the set of pixels selected at step 504. Once the variable base best rd has been initialized, the first filter denoted by variable n is selected at step 508. As depicted in FIG. 5, each time a filter n is selected, process 520 shown by a dashed line box is engaged. When process 520 is complete, step 506 determines if all of the n filters have been selected. If all of the n filters have not been selected, step 508 increments n and selects the next filter. If all of the n filters have been selected, step 534 determines if there are any additional macroblocks that must undergo the process depicted in FIG. 5. If any of the k macroblocks remain, step 504 increments k and selects the next macroblock. If no macroblocks remain, at step 526 the results of process 520 are implemented at loop filter 318.

Figure 7:
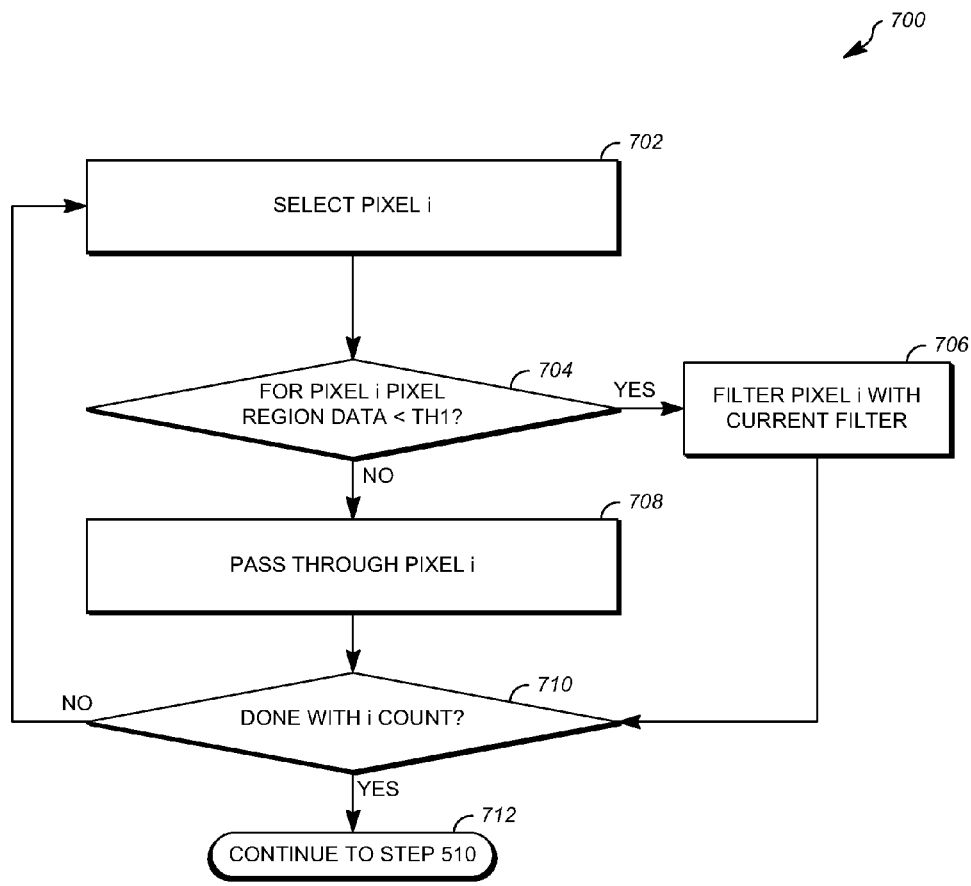
FIG. 7 is a flow chart of a technique for applying a filter to a set of pixels in accordance with an implementation of this disclosure.

Within process 520, the filter selected at step 508 is applied to the particular set of pixels selected at step 504. At step 530, the filter n is applied to macroblock k, where filter n engages each pixel in macroblock k according to, for example, technique 700 as shown in FIG. 7. During technique 700, each pixel in the set of pixels in macroblock k is analyzed in a predetermined order such as, for example, raster scan order or any other suitable order. When a pixel is engaged at step 702, that pixel can be considered a "target pixel." Data is retrieved from pixels in the region of the target pixel to make a determination or calculation with respect to a given target pixel. Specifically, data from a filter dependent region of pixels surrounding a target pixel is collected. For example, each pixel in the filter dependent region of pixels contains data related to how each pixel will appear when displayed, such as luma or chroma data represented by a number as depicted in 606. Based on this data, technique 700 determines if the target pixel should be filtered or bypassed without filtration at step 704. Process 520 is only an exemplary embodiment.

Referring to how threshold determinations are made, the determination at step 704 is made by comparing data from the filter dependent region of pixels 602 surrounding a target pixel 604 and comparing that data with a threshold or strength setting. The terms threshold and strength setting may be used interchangeably. Each filter F1-Fn may use a different type of threshold criteria. For example, step 704 may average all pixels in the filter dependent region of pixels to determine if they differ in value from the target pixel by less than a threshold value.

Step 704 may select filters that fall above or below a particular threshold criteria. In another exemplary embodiment, step 704 may indicate filter F1 should be applied to a given pixel if the statistical variance of the pixels in the filter dependent region is below a threshold value. The statistical variance threshold criteria may be less computationally intensive than the target pixel differential approach as fewer computations per pixel are required. Accordingly, the statistical variance approach may be used for filters with a large amount of taps, such as long blur filters.

Once a threshold determination is made at step 704, process 700 will either filter the target pixel at step 706 or pass through the target pixel without filtration at step 708. In either case, the next step is to move to the next pixel at step 710. In some embodiments, this process will continue until all pixels in the set of pixels selected at step 504 have received a threshold determination for the filter selected at step 508.

Figure 6A:
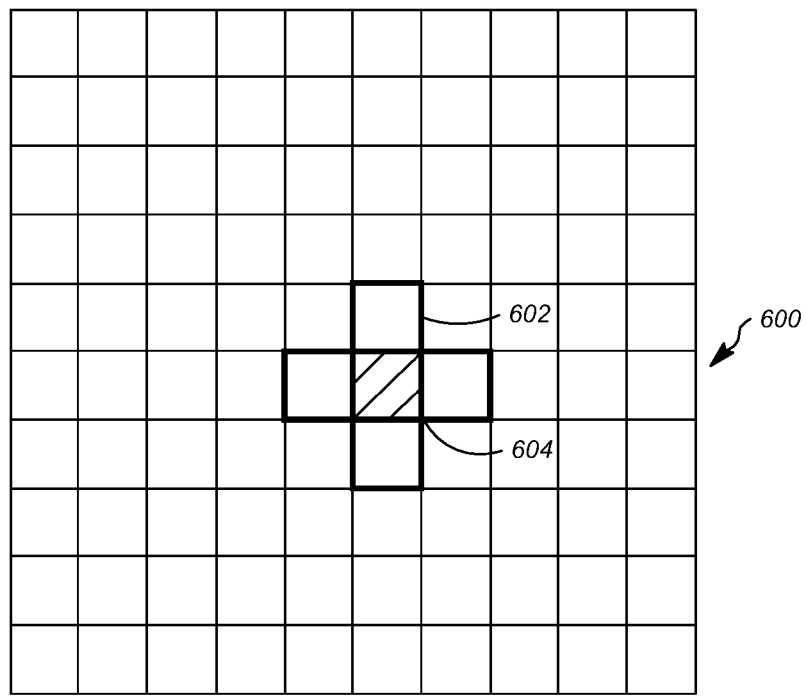
FIG. 6A is a schematic diagram of a set of pixels, a filter dependent region of pixels using one type of filter, and a target pixel in accordance with an implementation of this disclosure.
Figure 6B:
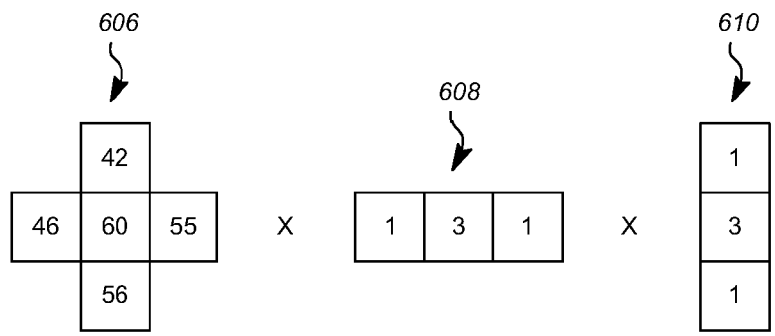
FIG. 6B is a schematic diagram of filtering a target pixel using one type of filter in accordance with an implementation of this disclosure.

By way of example, filter F1 may be a one dimensional filter such as a one dimensional finite impulse response (FIR) filter with 3 taps and weights of (1, 3, 1) designed to be applied in the horizontal and vertical directions about a target pixel, for example, as shown in FIG. 6B. Because of the properties of exemplary filter F1, the filter dependent region of pixels forms a cross section of pixels 602 including a row of 3 pixels centered at target pixel 604 and a column of 3 pixels centered at target pixel 604. When an n-tap filter is one dimensional and is designed to be applied in the horizontal and vertical directions, the filter dependent region will contain 2*n pixels and will form a cross section centered at the target pixel as shown in 602.

Figure 6C:
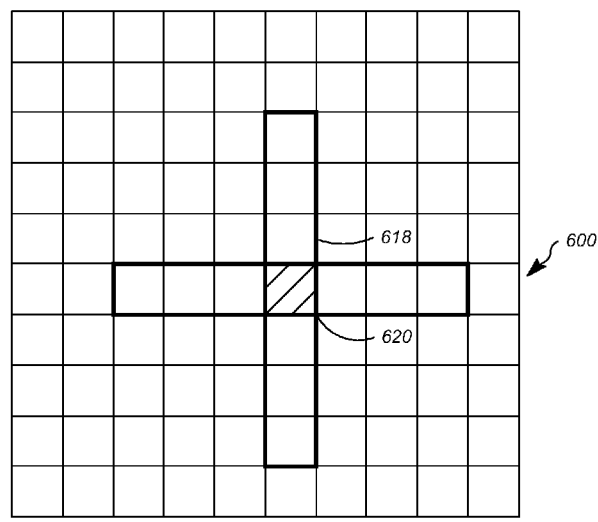
FIG. 6C is a schematic diagram of a set of pixels, a filter dependent region of pixels using another type of filter, and a target pixel in accordance with an implementation of this disclosure.

Additionally, filter F2, may be a one dimensional FIR filter with 5 taps and weights of (1, 1, 4, 1, 1) designed to be applied in horizontal and vertical directions to a target pixel, for example as shown in FIG. 6C. Filters F1-Fn can also be two dimensional square filters that form a block of pixels about a target pixel or any other type of filter. Each filter selection can have design advantages and disadvantages. For example, a threshold determination for a two dimensional filter will require more calculations than a one dimensional filter applied in the horizontal and vertical directions because the filter dependent region of pixels is larger. Filters F1-Fn may contain various other types of filters such as one or two dimensional filters, sharpening filters, blurring filters, linear filters, edge detecting filters, Gaussian filters, Laplacian filters, embossing filters, edge sharpening filters, or any other image processing filters with any number of taps or weights. In one exemplary embodiment, filters F1-Fn include one dimensional FIR filters with taps and weights of (1, 1, 1, 1, 1, 1, 1, 2, 1, 1, 1, 1, 1, 1, 1), (1, 1, 4, 1, 1) and (−1, 3, −1). In one exemplary embodiment, the (−1, 3, −1) filter is a default sharpening filter that is applied to all pixels in a set of pixels, such as a macroblock of pixels, at step 530 without determining whether each pixel in the set of pixels should be filtered or passed through without filtration at step 706.

In addition to the fact that each filter in F1-Fn may have a different threshold criteria, process 520 in FIG. 5 can also alter the threshold value for each filter selected at step 508 so that a given filter is provisionally applied to a given set of pixels at multiple threshold values. For example, filter F1 may use statistical variance as its threshold criteria. Filter F1 may also have several different statistical variance values or strength settings, each of which is applied to the given set of pixels at step 530. Specifically, once a first threshold value or strength setting is used at step 530 and the set of pixels undergo a second performance measurement at step 510, a new threshold value or strength setting is received at step 516. Each filter may have any number of strength settings. The process of determining and applying new strength settings may repeat until all strength settings have been measured for performance. Alternatively, process 520 may discontinue the process of receiving new strength settings if, for example, rate distortion measurements at step 510 indicate worsening rate distortion measurements for a predetermined number of measurements.

FIG. 6A is a schematic diagram of a set of pixels, a filter dependent region of pixels using one type of filter, and a target pixel in accordance with an implementation of this disclosure and FIG. 6B is a schematic diagram of filtering a target pixel using one type of filter in accordance with an implementation of this disclosure. The selected set of pixels selected at step 504 is shown as macroblock 600. Within technique 700, target pixel 604 is selected at step 702 while cross section 602 is the filter dependent region of pixels from which data is taken to filter target pixel 604. The target pixel shown in 6B has a value of 60 while the values of the remaining pixels in the filter dependent region of pixels are 42, 46, 56 and 55. Steps 608 and 610 show one aspect of the filtering process. Selectable filters F1-Fn can be of any type or dimension. One type of filter can be a one dimensional FIR filter applied in the horizontal and vertical directions, for example. The filter may be applied horizontally and then vertically or vertically and then horizontally. These filters are also known as kernels and contain an array of values with one element in the array designated as origin of the kernel. The origin of kernels 608 and 610, for example, is 3. The origin of the kernel corresponds to the pixel that will be affected by neighboring pixels in the kernel, which is the target pixel.

In FIG. 6B, origin 3 corresponds to target pixel i in step 704. In one embodiment, for example, if it is determined that any of the values 42, 46, 55 or 56 differ from the center pixel by less than a predetermined threshold at step 704, the target pixel with a value of 60 will be filtered. If the values are more than a predetermined threshold, the pixel will pass through the filter without filtration. Accordingly, depending on the strength setting determined at step 516, the number of pixels actually filtered in a given set of pixels for a given filter will change. Strength setting alteration step 516 may increase or decrease the strength setting or threshold value by a predetermined amount. To filter a target pixel, a convolution or correlation can be performed between the kernel and the filter dependent region of pixels 602 surrounding the target pixel 604. Convolutions and correlations calculate a weighted average of all the pixels in the filter dependent region 602. The resulting weighted average is used to replace the original target pixel value. As a result the target pixel value is altered or filtered based on the pixels in the filter dependent region surrounding it.

Figure 6D:
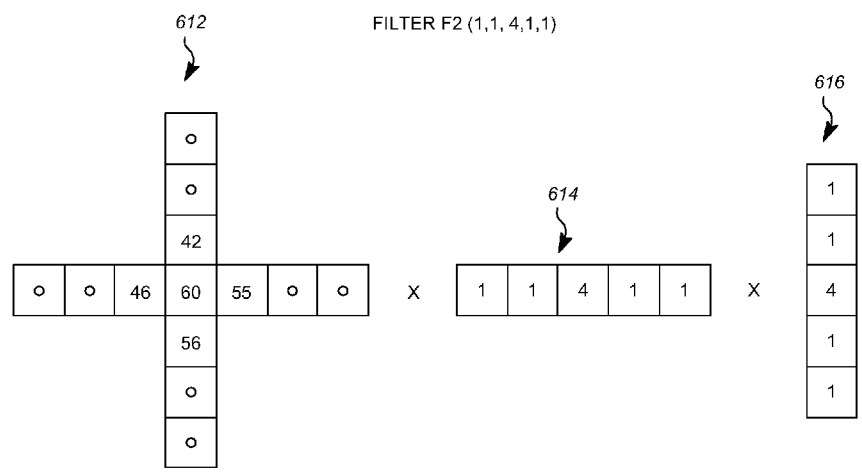
FIG. 6D is a schematic diagram of filtering a target pixel using another type of filter in accordance with an implementation of this disclosure.

FIG. 6C is a schematic diagram of a set of pixels, a filter dependent region of pixels using another type of filter, and a target pixel in accordance with an implementation of this disclosure and FIG. 6D is a schematic diagram of filtering a target pixel using another type of filter in accordance with an implementation of this disclosure. FIGS. 6C and 6D are analogous to FIGS. 6A and 6B and show a different filter having taps of (1,1,4,1,1) instead of (1,3,1). Included in FIGS. 6C and 6D is a target pixel 620, cross section 618 of a filter dependent region, and filter area 612 given by kernels 614 and 616.

Once a threshold determination has been made for all pixels in the set of pixels such that each pixel has either been filtered at step 706 or passed through at step 708, a second performance measurement can be taken, such as rate distortion, for the set of pixels at step 510. At step 512, it is determined whether the second performance measurement from step 510 is less than the initial performance measurement determined at step 532. If the second performance measurement after filtration at 530 is less than the initial performance measurement, variable best rd is updated with the new second performance measurement information. Furthermore, for each filter entering process 520, the filters can be measured for performance for each of any number of strength settings determined at step 516 as discussed previously. Although process 520 depicts an implementation where a performance rate distortion measurement is used, other performance measurements can be used.

In an implementation, each time a strength setting results in a performance measurement that exceeds previous measurements, the best rd variable is updated at step 514 and the current filter n and filter strength i is saved at step 518. Once the filters for all pixels in the set of pixels has gone through process 520 as indicated by step 534, information associated with the filter n and strength i having the best performance measurement can be forwarded to loop filter stage 318 at step 526. At loop filter stage 318, pixels can be filtered using the filter and filter strength forwarded by performance measuring stage 317 at a strength setting indicated by performance measuring stage 317.

The current filter n and filter strength i can be stored for transmission to be used at decoder 400 to recreate the same reconstructed and filtered image segment that was created at encoder 300. It should also be noted that in order to properly decode frames created at encoder 300, decoder 400 should implement a similar decoding path as the reconstruction path implemented by encoder 300.

The above description of technique 500 describes some exemplary implementations of performance measurement and loop filtration and other implementations of technique 500 are available, including those that include additional stages, remove certain stages, modify certain stages, split certain stages, and/or combine certain stages. In an implementation, stage 526 can be moved to be between stages 506 and 534 so that filter n and strength i is applied on a per macroblock k basis.

In an implementation, technique 500 can be adjusted to identify more than one filter and filter strength. For example, a filter n evaluated by process 520 can incorporate the use of two or more filters in sequence. In another example, process 520 can be altered to select a filter and then select one or more additional filters based on performance measurements of the additional filters based on an application of that filter to pixel values filtered by the selected filter. Accordingly, depending on results from stage 317, each set of pixels or macroblock 208 in frame 206 can have between zero and n filters implemented at loop filter stage 318.

Figure 8:
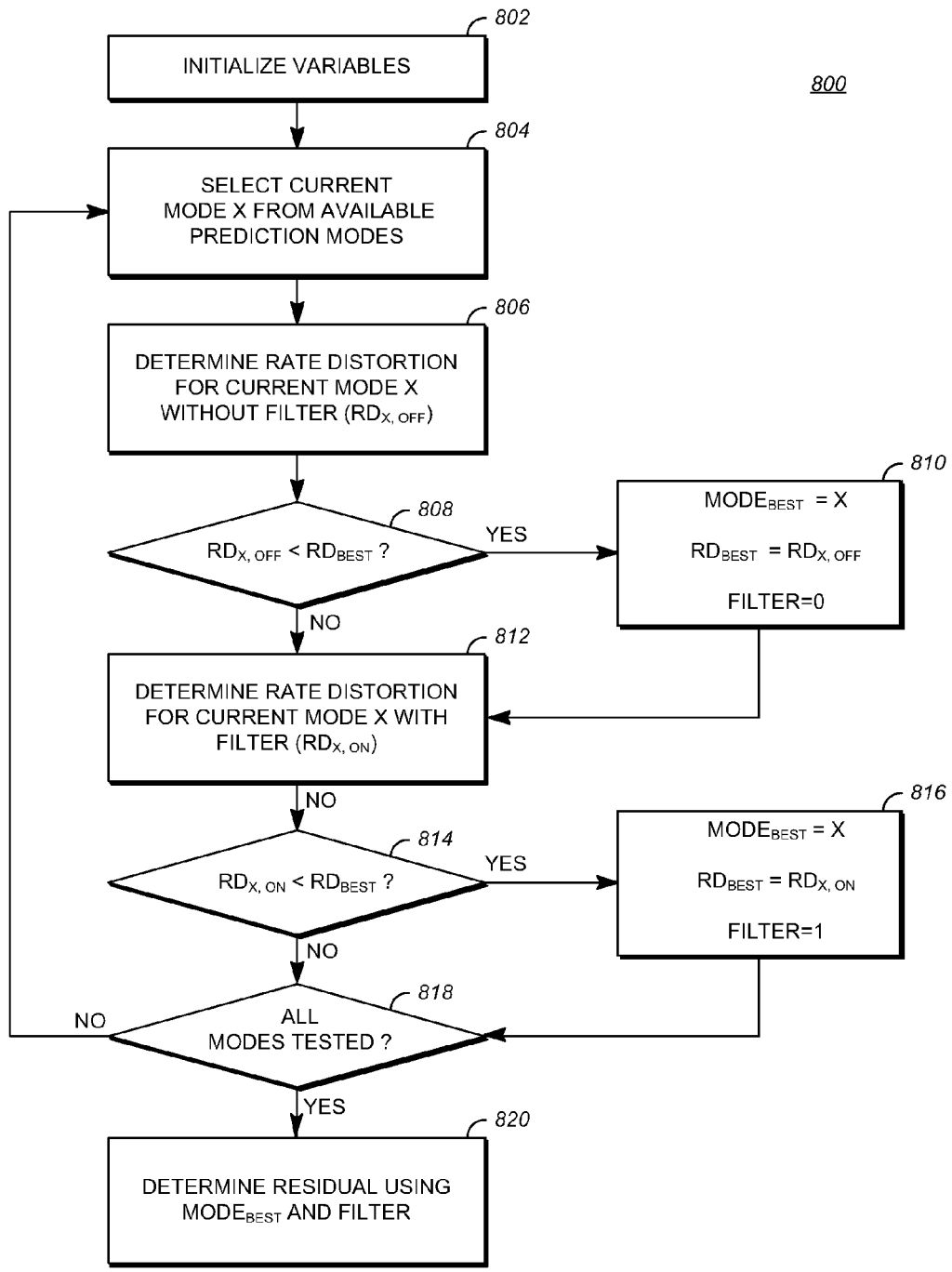
FIG. 8 is a flow chart of a technique for selective prediction signal processing in accordance with an implementation of this disclosure.

FIG. 8 is a flow chart of a technique 800 for selective prediction signal processing in accordance with an implementation of this disclosure. Technique 800 can be implemented, for example, within intra/inter prediction stage 304 of encoder 300. Technique 800 can be performed, for example, with respect to a current block in a frame. In an implementation, technique 800 begins by initializing variables at stage 802. For example, a variable indicating a best performance measurement ($RD_{BEST}$) can be initialized to an initial value, such as a rate distortion value that is greater than any expected rate distortion value generated by technique 800. As another example, variables indicating a best identified mode ($MODE_{BEST}$) and a best identified filter state (FILTER) can also be initialized.

At stage 804, a current mode X can be selected from available prediction modes. Available prediction modes for technique 800 can include all prediction modes included in encoder 300 or a subset thereof. For example, in various implementations, available prediction modes can include one of all inter-prediction modes, all intra-prediction modes, or both.

At stage 806, a performance measurement (e.g. rate distortion) for the current mode X without filtering ($RD_{X,OFF}$) is determined. To determine the performance metric, the current mode X can be used to identify prediction samples for predicting the current block, comparing the prediction samples to the current block, and determining the metric using the comparison. The identified prediction samples are not filtered at stage 806. In an implementation, determining the performance metric can include considering a number of bits needed to encode indications of mode X and the filter selection (e.g., FILTER=0) into the encoded bitstream. The performance measurement $RD_{X,OFF}$ is compared to the best rate distortion value $RD_{BEST}$ at stage 808. If $RD_{X,OFF}$ is less than $RD_{BEST}$, control passes to stage 810.

At stage 810, the best identified mode ($MODE_{BEST}$) is set to the current mode X, the best rate distortion value ($RD_{BEST}$) is set to $RD_{X,OFF}$, and the filter state (FILTER) is set to 0. After stage 810, control passes to stage 812. Alternatively, if $RD_{X,OFF}$ is greater or equal than $RD_{BEST}$, control passes to stage 812 from stage 808.

At stage 812, a performance measurement (e.g. rate distortion) for the current mode X with filtering ($RD_{X,ON}$) is determined. To determine the performance metric, the current mode X can be used to identify prediction samples for predicting the current block. The identified prediction samples can then be filtered, for example, by using a pre-determined filter. The filtering of the prediction samples can in addition or alternatively use techniques such as adaptations of those described with respect to FIGS. 5, 6A-D, and/or 7. The filtered prediction samples can be compared to the current block and the performance metric can be determined using the comparison. In an implementation, determining the performance metric can include considering a number of bits needed to encode indications of mode X and the filter selection (e.g., FILTER=1) into the encoded bitstream.

The performance measurement $RD_{X,ON}$ is compared to the best rate distortion value $RD_{BEST}$ at stage 814. If $RD_{X,ON}$ is less than $RD_{BEST}$, control passes to stage 816. At stage 816, the best identified mode ($MODE_{BEST}$) is set to the current mode X, the best rate distortion value ($RD_{BEST}$) is set to $RD_{X,ON}$, and the filter state (FILTER) is set to 1. After stage 816, control passes to stage 818. Alternatively, if $RD_{X,ON}$ is greater or equal than $RD_{BEST}$, control passes to stage 818 from stage 814.

At stage 818, a determination is made as to whether all available prediction modes have been tested (e.g., whether each available prediction mode has been processed through stages 804 to 816). If not all available prediction modes have been tested, control passes to stage 804, where a new current mode X is selected from remaining available prediction modes. Otherwise, control passes to stage 820, where a residual is determined using the $MODE_{BEST}$ and FILTER settings determined by technique 800. In other words, a residual is generated using the combination of mode and filter that produces a smallest (e.g., best) performance measurement (e.g., rate distortion).

Following stage 820 (not shown), $MODE_{BEST}$ and FILTER can be encoded into the compressed bitstream along with the generated residual, for example, by use of probability encoding techniques by entropy encoding stage 310. For example, FILTER can be entropy encoded using a binary flag or a tri-state flag. In an implementation using a binary flag, a flag (e.g., FILTER) can be encoded for each block (e.g., using a BoolCoder) based on a encoding probability (pred_filter_prob) that is generated, for example, based on a count of number of blocks where the filter is disabled (pred_filter_off_count) and a number of blocks where the filter is enabled (pred_filter_on_count), such as shown with respect to equation 1:

$$\text{pred\_filter\_prob} = \frac{\text{pred\_filter\_off\_count} * 255}{\text{pred\_filter\_off\_count} + \text{pred\_filter\_on\_count}} \quad [\text{Equation 1}]$$

The value of pred_filter_prob can be encoded into the compressed bitstream at the frame level and can be used to probabilistically encode the binary flag FILTER for each block within the frame. In an implementation, pred_filter- _prob can be encoded as an 8-bit literal value, using less than 8-bits based on a modeling algorithm, using a differential with a pred_filter_prob value encoded for a previous frame, or a combination thereof.

In an implementation using a tri-state flag, a mode can be encoded at the frame level (e.g., by entropy encoding stage 310 using probability encoding techniques such as Bool-Coder) and can indicate, for example, whether filtering should be enabled for the entire frame (0), disabled for the entire frame (1), or signaled at a per-macroblock level (2). If the per-macroblock level (2) mode is utilized, the binary flag technique described above can be used to encode a binary flag for each macroblock. In a one-pass encoder, the pred_filter_prob for a previous frame can be utilized instead of the pred_filter_prob for the current frame, since the value for the current frame can be determined once the entire frame is processed.

The above description of technique 800 describes some exemplary implementations of selective prediction signal processing and other implementations of technique 800 are available, including those that include additional stages, remove certain stages, modify certain stages, split certain stages, and/or combine certain stages. A number of alternative implementations are possible, including, but not limited to, the use of one or more of the additional and/or alternative techniques described below.

In an implementation, the available prediction modes for encoding can include one or more intra-prediction modes. Prediction samples can be identified using an intra-prediction mode and can optionally be filtered once identified. Alternatively or additionally, the intra-prediction mode can identify prediction samples based on pixels that are filtered before the prediction samples are identified. In an example, blocks of pixels above and to the left of a current block being encoded can be filtered before prediction samples are identified.

In an implementation, more than one filter (e.g., filter type and/or filter strength) can be considered in conjunction with available prediction modes. For example, an optimized filter can be identified for each prediction mode, multiple filters can be identified for at least some prediction modes, multiple filters can be identified without respect to prediction mode, or a combination thereof. Some prediction modes can have one or more associated filter, based on, for example, the suitability of the associated filters for use with their respective prediction modes. Available filters can include high-pass, low-pass, thresholded, separable, or non-separable filters. For example, a thresholded filter can be configured to filter a pixel only if the pixel to be filtered has adjoining pixels that have similar characteristics in an effort to preserve edges within the frame.

In the event that multiple filters are considered, an indication of the type and/or strength of filter used can be encoded into the compressed bitstream to enable a decoder to apply the same filter and strength during decoding (e.g., in addition to or instead of the FILTER flag). Thus, a filter indicator can include a binary flag (e.g., FILTER), a tri-state flag, an indication of filter type and/or strength, or a combination thereof.

In an implementation, available prediction modes can be defined to include a determination of whether filtering is to be performed. In other words, the filter indicator can be included within the prediction mode (e.g. defined based on the prediction mode).

In an implementation, the available prediction modes for encoding can include one or more inter-prediction modes. Inter-prediction can include performing a candidate search for a reference block (e.g., prediction samples), and the identification of the reference block can include considering unfiltered candidate search locations, filtered candidate search locations, or a combination thereof. The resulting reference block can therefore be identified based on pre-filtered candidate search locations, candidate search locations without pre-filtering, or a combination thereof. The use of pre-filtered candidate search locations can be used in addition to or instead of filtering identified prediction samples.

In an implementation, the use of selective prediction signal processing can be used in lieu of sub pixel motion compensation. Sub pixel motion compensation can include filtering candidate reference blocks to estimate virtual pixel values at locations between pixels. Selective prediction signal processing can provide a similar benefit as sub pixel motion compensation, and thus can be used instead of sub pixel motion compensation to improve efficiency of encoding.

In an implementation, the use of selective prediction signal processing can be used in lieu of Average Reference (frame) Noise Reduction (ARNR) filtering or in combination with a reduced level of ARNR filtering. ARNR filtering can include calculating an average of pixel values over a number of frames (e.g., 20 successive frames). ARNR filtering can provide an alternative reference frame with reduced noise to be used for inter-prediction. Selective prediction signal processing can provide similar benefits as ARNR filtering. Reduced ARNR filtering can include reducing a number of frames used to generate ARNR filtering.

In an implementation, a filter strength and/or type selected for an inter prediction mode can be determined based on a motion vector selected for the inter prediction mode. The filter strength and/or type can be based on a magnitude of the motion vector. For example, a stronger filter strength can be used for larger motion vector magnitudes and a weaker filter strength can be used for smaller motion vector magnitudes. As another example, a motion blur filter can be selected for larger motion vector magnitudes to compensate for blurring and a weak filter can be selected for smaller motion vector magnitudes to preserve detail. The filter strength and/or type can also be based on a direction of the motion vector. For example, a blur filter can be applied in the direction of the motion vector to compensate for blurring occurring in the direction of movement.

In an implementation a filter indicator can be entropy encoded into the compressed bitstream using contextual techniques. For example, a filter indicator for a block can be encoded based on the filter indicator for adjoining blocks, such as the blocks above and to the left of the block. These and other implementations of technique 800 are possible, including variations and combinations of the various implementations described herein.

Figure 9:
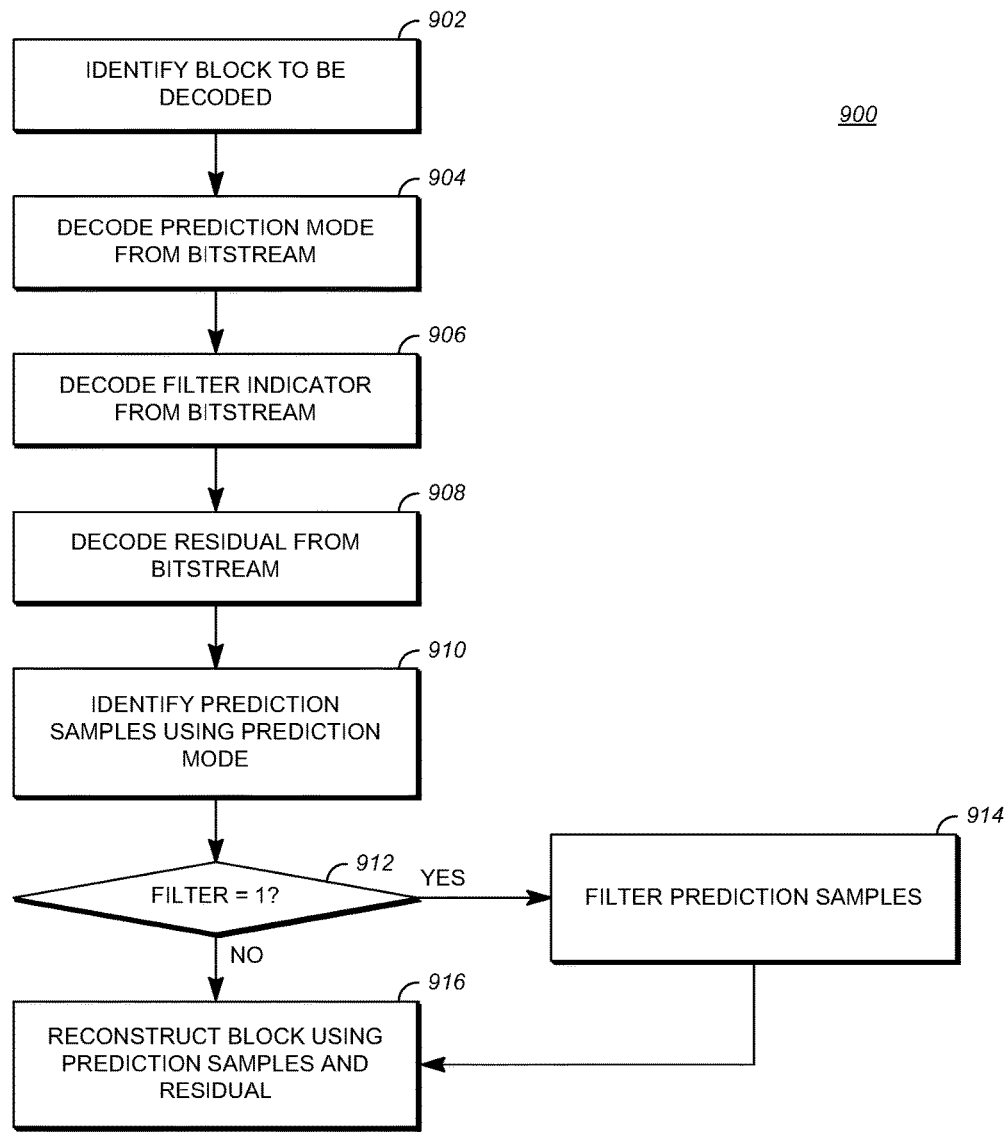
FIG. 9 is a flow chart of a technique for decoding a compressed bitstream encoded using selective prediction signal processing in accordance with an implementation of this disclosure.

FIG. 9 is a flow chart of a technique 900 for decoding a compressed bitstream encoded using selective prediction signal processing in accordance with an implementation of this disclosure. Technique 900 can be implemented, for example, within intra/inter prediction stage 410 of decoder 400. Technique 900 can be performed, for example, with respect to a current block in a frame. In an implementation, technique 900 begins by identifying a block (or other group of pixels) to be decoded at stage 902. At stage 904, a prediction mode used for encoding the identified block is decoded from the bitstream, using, for example, entropy decoding stage 404. At stage 906, a filter indicator (e.g., FILTER) is decoded from the bitstream, using, for example, entropy decoding stage 404. At stage 908, a residual is decoded from the bitstream, using, for example, entropy decoding stage 404.

At stage 910, prediction samples are identified using the decoded prediction mode. For example, the prediction mode can be an inter-prediction mode, and the decoded prediction mode can include a motion vector identifying a reference block having the prediction samples to be used for decoding. At stage 912, a determination is made whether FILTER=1. If FILTER=1, the identified prediction samples are filtered at stage 914. Next, and also if FILTER=0, control passes to stage 916, where the block is reconstructed using the prediction samples or filtered prediction samples and the decoded residual.

The above description of technique 900 describes some exemplary implementations of decoding a compressed bitstream encoded using selective prediction signal processing. Other implementations of technique 900 are available, including those that include additional stages, remove certain stages, modify certain stages, split certain stages, and/or combine certain stages. A number of alternative implementations are possible, including, but not limited to, the use of techniques capable of decoding a bitstream encoded using alternative implementations of technique 800, such as those described above. For example, the decoded filter indicator can include an indication of filter type and/or strength instead of a boolean indicator that filtering is to be performed and the indicated filter type and/or strength can be used to filter the prediction samples at stage 914. As another example, the filter indication can be incorporated into the prediction mode and stage 904 can be omitted and stage 912 and 914 can be incorporated into stage 910.

Accordingly, as can be understood from the description above, aspects of this disclosure add a processing stage within an intra/inter prediction stage (e.g., 304). During this stage, a most appropriate coding mode can be selected for each group of pixels (individual, sub-blocks, macro-blocks or segments) within a frame. The coding mode can be selected from a set of coding modes based on minimizing one or more error metrics between an original value (or original data) and a predicted value (or predicted data). Intra-modes (such as DC_PRED) create the prediction value from data already encoded within the same frame, while inter-modes use data from one of a number of previously encoded reference frames, e.g., the last, golden or alternative reference frames.

In one implementation, the prediction data that is outputted as a result of applying a coding mode to reference frame data is filtered to create an alternative prediction block. The encoder can consider both the filtered and unfiltered prediction variants for each coding mode and can use a rate-distortion function, for example, to decide which mode and filter state (off/on) to use for a particular set of pixels; balancing the additional "cost" of signaling the filter state (off/on) against anticipated ensuing savings in encoding a reduced residual signal.

As an example, in one implementation, a motion compensation stage may result in a fractional pixel motion vector. Once the vector has been selected, a prediction is created from a designated reference frame using the selected motion vector. This prediction can be evaluated by computing the cost of encoding the residual error and adding the cost of signaling the state of the filter (off in this example) providing a first coding option. The filter can then be applied to the prediction signal and the evaluation process repeated, this time factoring in the cost of signaling that the filter should be enabled, to give a second coding option. The different filters can be understood as giving rise to new prediction modes (e.g., a "0,0 motion vector" mode and a new "0,0 motion vector plus filtering" mode). Accordingly, unfiltered data can be retained as an alternative for a current block or future blocks. Once various mode/filter combinations have been evaluated, the combination providing a best rate-distortion trade-off can be selected for the final encoding.

Further, as can be understood from the description above, the mode can be encoded and the state of the prediction filter for each group of pixels (e.g., each macroblock, segment, etc.) can be signaled. In one implementation, the signaling is accomplished by using a binary flag (which may be called, for example, prediction_filter_state). The binary flag can be encoded for each group of pixels (e.g., macroblock, segment, etc.) specifying whether the prediction filter is disabled (e.g., with a value of 0) or enabled (e.g., with a value of 1) for that group of pixels (e.g., macroblock, segment, etc.), for example. Other values may also be used. The binary flag can be encoded using the BoolCoder into the final output bitstream during an entropy encoding stage, e.g., 310. During mode selection, counts of the number of group of pixels (e.g., macroblocks, segments, etc.) where the filter is disabled (e.g., pred_filter_off_count) and enabled (e.g., pred_filter_on_count) can be maintained and used to compute the encoding probability, e.g., using Equation 1. The value of pred_filter_prob can be encoded into a bitstream at the frame level, e.g., as an 8-bit literal value. In alternative implementations, the value of pred_filter_prob is encoded differentially from the value in the previous frame, or in less than 8-bits, e.g., using a relevant modeling algorithm.

In one implementation, the signaling is accomplished using a tri-state flag (which may be called, for example, prediction_filter_mode). The tri-state flag can be encoded at the frame level signaling that the prediction filter should be turned off (e.g., with a value of 0) or on (e.g., with a value of 1) for all group of pixels in the current frame (e.g., all macroblocks in the current frame), or indicating that the decision will be signaled independently at the group of pixel-level, such as at the macroblock-level, (e.g., with a value of 2). In the latter case, individual prediction_filter_state flags can be encoded for each group of pixels (e.g., each macroblock) as per the signaling method described above in relation to the binary flag. During mode selection, the pred_filter_prob computed for a previous frame can be used to compute the cost of signaling the prediction_filter_state flags for each group of pixels (e.g., each macroblock), since the value for the current frame may only be known at the end of mode selection in certain implementations. Alternatively, a first-pass could determine an estimation of this probability that could subsequently be used during a second-pass encode. The prediction_filter_mode flag can be encoded at the frame level using the BoolCoder.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The use of the adjectives "first," "second," "third," etcetera herein is not intended to infer any particular meaning regarding a relationship between elements (e.g., ordering, positioning, etc.) unless specifically indicated. For example, a first frame and a second frame of a video stream can refer to any two frames of the video stream and does not necessarily indicate that the first frame and the second frame are the first two frames of the video stream or that the first frame is located before the second frame.

The use of the adjectives "better," "best," etcetera with respect to elements herein is not intended to infer that a particular element is the best possible element or is better than all other possible elements. Instead, the adjectives "better" and "best" are intended to indicate the relative strength or ranking of an element as compared to one or more other known elements based on particular criteria that may or may not be the most advantageous possible criteria to determine said ranking or strength.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The processors described herein can be any type of device, or multiple devices, capable of manipulating or processing information now-existing or hereafter developed, including, for example, optical processors, quantum and/or molecular processors, general purpose processors, special purpose processors, intellectual property (IP) cores, ASICS, programmable logic arrays, programmable logic controllers, microcode, firmware, microcontrollers, microprocessors, digital signal processors, memory, or any combination of the foregoing. In the claims, the terms "processor," "core," and "controller" should be understood as including any of the foregoing, either singly or in combination. Although a processor of those described herein may be illustrated for simplicity as a single unit, it can include multiple processors or cores.

In accordance with an implementation of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for performing a coding operation on video data using a computing device containing a plurality of processors in accordance with an implementation of the invention.

A computer-readable medium may be a non-transitory computer-readable media including all forms and types of memory and all computer-readable media except for a transitory, propagating signal. In an implementation, the non-volatile memory or computer-readable medium may be external memory.

Although specific hardware and data configurations have been described herein, note that any number of other configurations may be provided in accordance with implementations of the invention. Thus, while there have been shown, described, and pointed out fundamental novel features of the invention as applied to several implementations, it will be understood that various omissions, substitutions, and changes in the form and details of the illustrated implementations, and in their operation, may be made by those skilled in the art without departing from the spirit and scope of the invention. Substitutions of elements from one implementation to another are also fully intended and contemplated. The invention is defined solely with regard to the claims appended hereto, and equivalents of the recitations therein.

What is claimed is:

1. A method for encoding a video signal having a frame comprising:
    determining a first performance measurement for a first set of prediction samples identified for a group of pixels of the frame using a first prediction mode;
    generating filtered sets of prediction samples for the group of pixels by applying a filter to a second set of prediction samples at each of a plurality of filter strength settings, wherein at least one of the filtered set of prediction samples or the second set of prediction samples are identified using a second prediction mode;
    determining a second performance measurement for the filtered sets of prediction samples, wherein the second performance measurement is associated with a best-performing filter strength setting from the plurality of filter strength settings;
    generating, using a processor, a residual based on the filtered set of prediction samples and the group of pixels if the second performance measurement exceeds the first performance measurement; and
    encoding the frame using the residual.

2. The method of claim 1, wherein the performance measurements are rate distortion measurements.

3. The method of claim 1, wherein the first and second prediction modes are each an inter-prediction mode.

4. The method of claim 1, wherein the first set of prediction samples is the same as the second set of prediction samples, the first prediction mode is the same as the second prediction mode, and encoding the frame includes encoding a filter indicator indicating that the group of pixels was encoded using the filtered set of prediction samples.

5. The method of claim 4, wherein the filter indicator includes a filter identifier.

6. The method of claim 4, wherein the filter indicator includes a filter strength identifier that identifies the best-performing filter strength setting.

7. The method of claim 1, further comprising:
    determining a third performance measurement for a set of pixels decoded from the encoded frame;
    provisionally applying one or more filters to the set of pixels;
    determining a fourth performance measurement for each filter provisionally applied to the set of pixels; and
    generating a reconstruction of the frame using one or more selected filters, the selected filters selected based on comparisons indicating that their fourth performance measurements exceed the third performance measurement.

8. The method of claim 1, wherein the filter is one of a sharpening filter or a blurring filter.

9. The method of claim 1, wherein the filter is a one dimensional filter with n taps applied to a target pixel in both a horizontal a vertical direction.

10. The method of claim 1, wherein applying the filter to the set of prediction samples includes applying the filter to a prediction sample in the set of prediction samples if a measurement of a filter dependent region of the prediction sample satisfies a threshold criteria.

11. The method of claim 10, wherein the measurement of the filter dependent region is a statistical variance and the threshold criteria is a pre-determined statistical variance.

12. The method of claim 1, wherein applying the filter to the second set of prediction samples includes applying the filter to pixels that are prospective prediction samples before the second set of prediction samples are identified using the second prediction mode.

13. The method of claim 12, wherein the second prediction mode is an intra-prediction mode.

14. The method of claim 1, wherein the first and second prediction modes identify prediction samples without using sub-pixel motion compensation.

15. The method of claim 1, wherein the filter is selected based on a motion vector identified by the second prediction mode.

16. The method of claim 15, wherein the filter blurs in a direction of the motion vector.

17. An apparatus for encoding a video signal having a frame comprising:
   a memory; and
   a processor configured to execute instructions stored in the at least one memory to:
      determine a first performance measurement for a first set of prediction samples identified for a group of pixels of the frame using a first prediction mode,
      generate filtered sets of prediction samples for the group of pixels by applying a filter to a second set of prediction samples at each of a plurality of filter strength settings, wherein at least one of the filtered set of prediction samples or the second set of prediction samples are identified using a second prediction mode,
      determine a second performance measurement for the filtered sets of prediction samples, wherein the second performance measurement is associated with a best-performing filter strength setting from the plurality of filter strength settings,
      generate a residual based on the filtered set of prediction samples and the group of pixels if the second performance measurement exceeds the first performance measurement, and
      encode the frame using the residual.

18. A method for decoding an encoded video signal comprising:
   decoding a prediction mode, a filter indicator, and a residual associated with a group of pixels of a frame of the encoded video signal, wherein the filter indicator includes a filter strength identifier at a filter strength setting;
   identifying a set of prediction samples for decoding the group of pixels based on the prediction mode;
   applying a filter to the identified set of prediction samples based on the filter indicator to generate a filtered set of prediction samples, wherein the filter is applied at the filter strength setting; and
   generating a reconstructed group of pixels using the filtered set of prediction samples and the residual.

19. The method of claim 18, further comprising:
   decoding a loop filter indicator associated with the group of pixels from the encoded video signal; and
   applying a loop filter to the reconstructed group of pixels based on the loop filter indicator to generate a group of pixels of an output video stream.

20. The method of claim 18, wherein the filter indicator is decoded using a prediction of the filter indicator based on at least one adjacent group of pixels to the group of pixels.

* * * * *